US007730033B2

(12) United States Patent
Mohamed

(10) Patent No.: US 7,730,033 B2
(45) Date of Patent: Jun. 1, 2010

(54) MECHANISM FOR EXPOSING SHADOW COPIES IN A NETWORKED ENVIRONMENT

(75) Inventor: Ahmed Hassan Mohamed, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 261 days.

(21) Appl. No.: 10/461,564

(22) Filed: Jun. 13, 2003

(65) Prior Publication Data

US 2004/0254936 A1 Dec. 16, 2004

(51) Int. Cl.
G06F 7/00 (2006.01)
G06F 17/00 (2006.01)
G06F 17/30 (2006.01)

(52) U.S. Cl. ............... 707/649; 707/654; 707/823; 707/829; 707/831

(58) Field of Classification Search ........... 711/136, 711/162, 203, 216; 707/200, 204
See application file for complete search history.

(56) References Cited

U.S. PATENT DOCUMENTS

| 5,043,876 | A | | 8/1991 | Terry ..................... 364/200 |
| 5,706,510 | A | | 1/1998 | Burgoon ................. 395/619 |
| 5,778,395 | A | * | 7/1998 | Whiting et al. .......... 707/204 |
| 5,905,990 | A | | 5/1999 | Inglett ................... 707/200 |
| 6,026,414 | A | * | 2/2000 | Anglin ................... 707/204 |
| 6,131,148 | A | * | 10/2000 | West et al. .............. 711/162 |
| 6,175,904 | B1 | * | 1/2001 | Gunderson .............. 711/162 |
| 6,269,431 | B1 | * | 7/2001 | Dunham ................. 711/162 |
| 6,611,850 | B1 | * | 8/2003 | Shen ..................... 707/204 |
| 6,883,083 | B1 | * | 4/2005 | Kemkar ................. 711/203 |
| 6,918,113 | B2 | * | 7/2005 | Patel et al. ............. 717/178 |
| 2001/0029512 | A1 | * | 10/2001 | Oshinsky et al. ........ 707/204 |
| 2003/0018878 | A1 | * | 1/2003 | Dorward et al. ......... 711/216 |
| 2003/0028517 | A1 | | 2/2003 | Nakano et al. ............. 707/1 |
| 2003/0097640 | A1 | | 5/2003 | Abrams et al. ........... 715/530 |
| 2003/0167380 | A1 | * | 9/2003 | Green et al. ............ 711/136 |
| 2004/0107222 | A1 | * | 6/2004 | Venkatesh et al. ....... 707/200 |
| 2004/0186858 | A1 | * | 9/2004 | McGovern et al. ....... 707/200 |

OTHER PUBLICATIONS

Molay, Bruce. "Understanding Unix/Linux Programming: A Guide to Theory and Practice", 2003, Prentice Hall, p. 73.*
Office Action dated Apr. 17, 2009, issued in Chinese Patent Application No. 200410048943.8.

* cited by examiner

*Primary Examiner*—Charles Rones
*Assistant Examiner*—Charles D Adams
(74) *Attorney, Agent, or Firm*—Merchant & Gould, P.C.

(57) ABSTRACT

Described is a mechanism for exposing a volume shadow copy of a shared volume over a network to a remote client. A shared volume is accessed at a client computing system having a root. A volume shadow copy (or "snapshot") of the volume is identified as a child resource of the shared volume. The child resource representing the snapshot may be hidden from ordinary view by default. To access the snapshot, a user may access the child resource as if it were an ordinary file or directory on the shared volume. Advantageously, the user need not mount a new volume representing the snapshot volume, but rather the user may directly access the snapshot.

18 Claims, 5 Drawing Sheets

US 7,730,033 B2

MECHANISM FOR EXPOSING SHADOW COPIES IN A NETWORKED ENVIRONMENT

FIELD OF THE INVENTION

The present invention relates to distributed file systems. More particularly, the present invention relates to distributed file systems and exposing shadow copies of shared volumes on the distributed file systems.

BACKGROUND OF THE INVENTION

Client/server network environments have become ubiquitous. It is routine today for client computing systems to connect over a network to file storage resident on a server. There are also many different computing architectures and platforms being used in today's computing environments.

Competition among network hardware and software providers drives them to offer more and more sophisticated services in conjunction with their products. For instance, simple backup and file restore capabilities are becoming a common offering. Today, many network servers offer the ability for a user of network storage to roll back the state of the storage to the way it was at some previous time. This ability makes simple the act of remedying lost data in the case of some unforeseen accident that falls short of a hardware failure. For example, a user of a network system may one day realize that a file on his server has become corrupted, or for some other reason would simply like to revisit the state of his files at some prior point in time. Volume shadow copies (also called "snapshots") are used today for specifically that purpose. Volume shadow copies are essentially a view of the state of a volume at some earlier time. Volume shadow copies have become a common mechanism for rolling back the state of a volume. Throughout this document, the terms volume shadow copy and snapshot may be used interchangeably.

One drawback of existing server technologies is that to access a volume shadow copy in a client/server environment, the snapshot must be mounted at the client machine. This procedure typically requires a user to be logged into the client machine with sufficient privileges to mount a volume, which may typically require administrative privileges. The convenience of volume shadow copies is diminished if a user must locate an administrator or other user with sufficient privileges each time he desires to access a snapshot.

Another drawback to these technologies is that mounting a different volume to expose each shadow copy of a share tends to pollute the namespace. In other words, if multiple shadow copies of a shared volume are mounted, the user may be confused by having several different versions of what appears to be the same volume.

An adequate mechanism for exposing shadow copies of a shared volume to clients in a networked environment has eluded those skilled in the art.

SUMMARY OF THE INVENTION

The present invention is directed at a system and method for exposing a volume shadow copy of a shared volume over a network to a remote client. Briefly stated, a shared volume is accessed at a client computing system having a root. A volume shadow copy (or "snapshot") of the volume is identified as a child resource of the shared volume. The child resource representing the snapshot may be hidden from ordinary view by default. To access the snapshot, a user may access the child resource as if it were an ordinary file or directory on the shared volume. Advantageously, the user need not mount a new volume representing the snapshot volume, but rather the user may directly access the snapshot.

DETAILED DESCRIPTION OF THE PREFERRED EMBODIMENT

The invention will be described here first with reference to one example of an illustrative computing environment in which embodiments of the invention can be implemented. Next, a detailed example of one specific implementation of the invention will be described. Alternative implementations may also be included with respect to certain details of the specific implementation. It will be appreciated that embodiments of the invention are not limited to those described here.

Illustrative Computing Environment of the Invention

Figure 1:
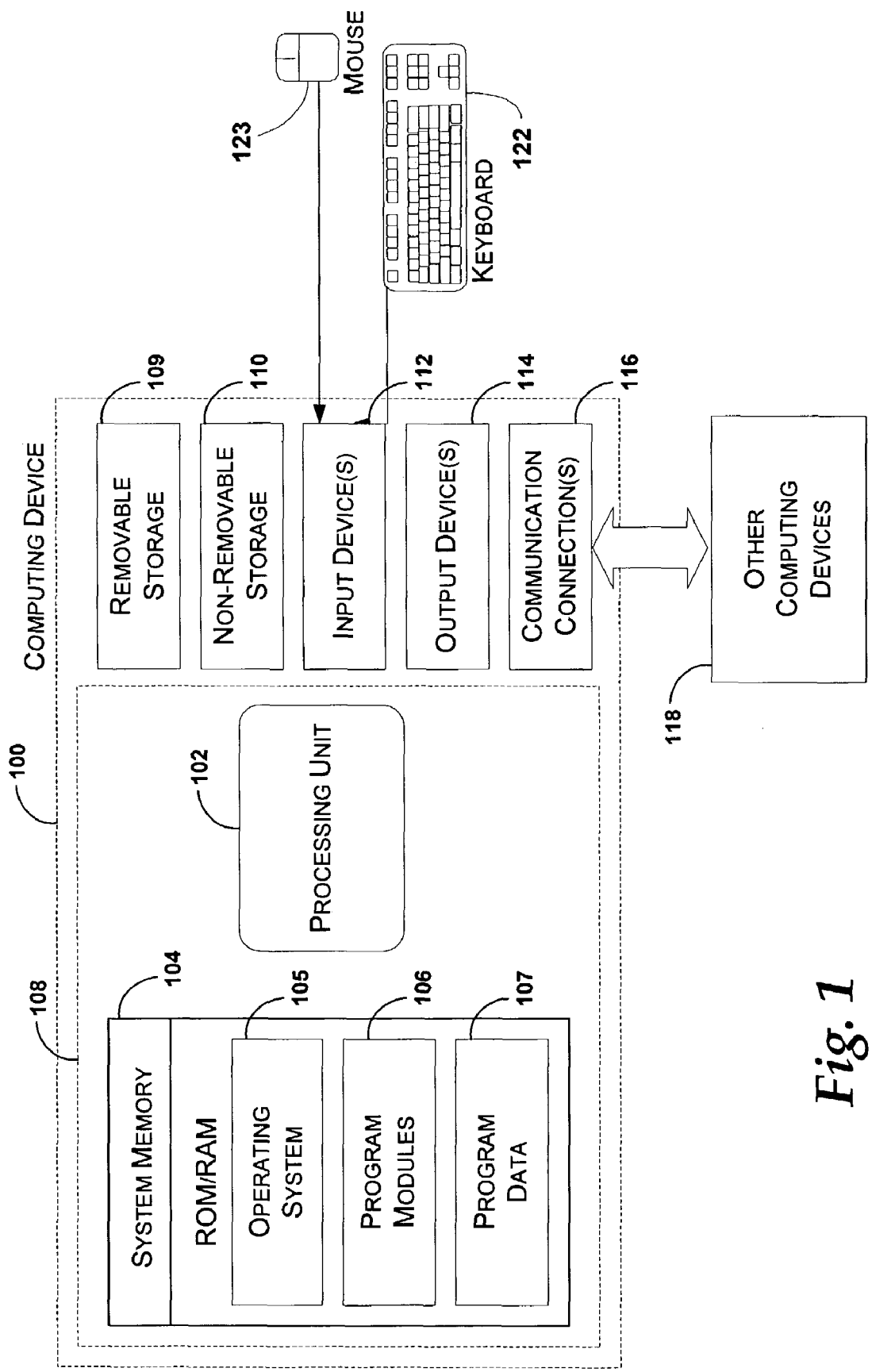
FIG. 1 is a functional block diagram that illustrates a computing device that may be used in implementations of the present invention.

FIG. 1 illustrates a computing device that may be used in illustrative implementations of the present invention. With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration of computing device 100 is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard 122, mouse 123, pen, voice input device, touch input device, scanner, etc. Output device (s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Discussion of Specific Implementation

Figure 2:
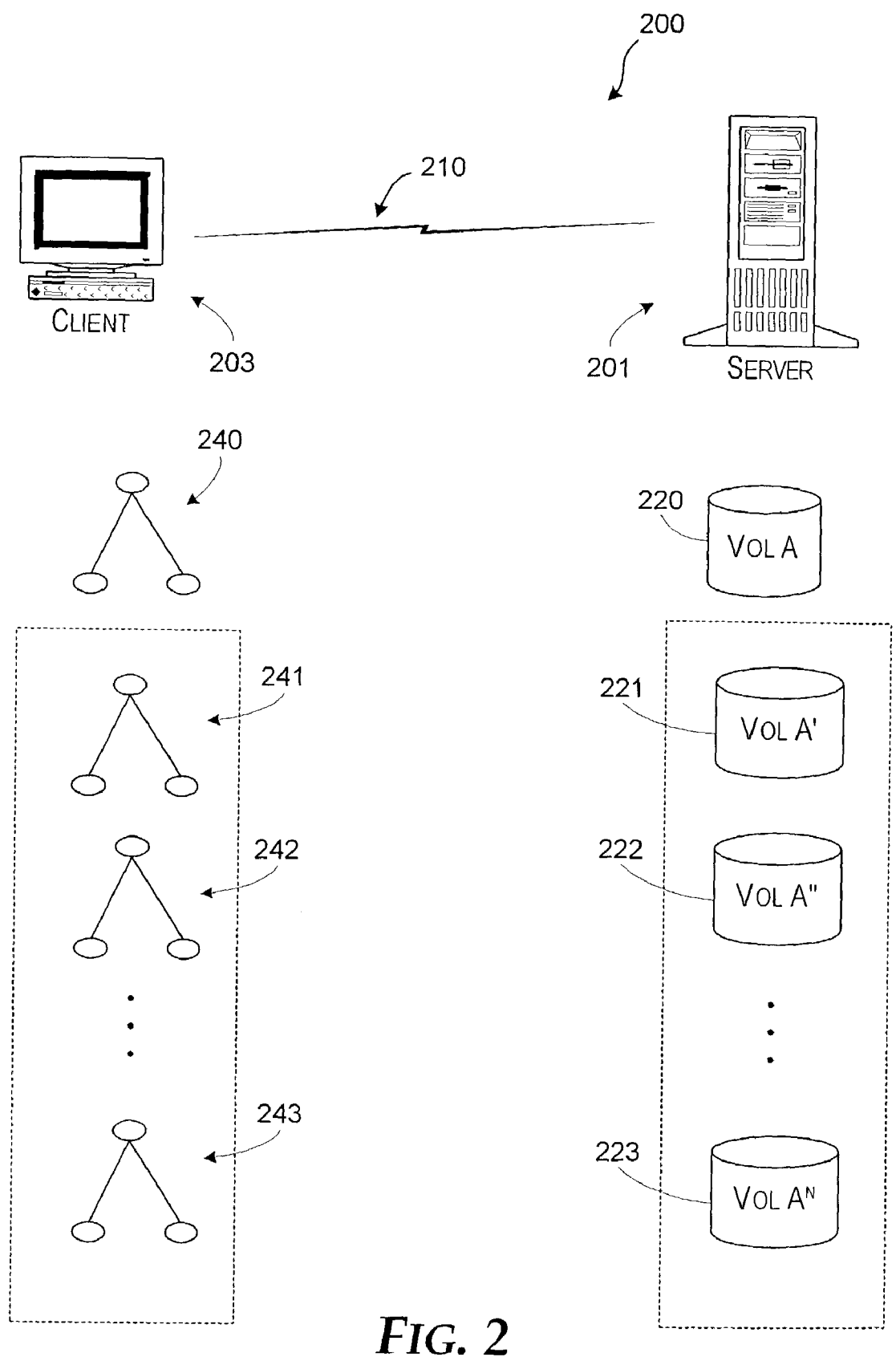
FIG. 2 is a functional block diagram generally illustrating a network environment in which embodiments of the invention may be implemented.

FIG. 2 is a functional block diagram generally illustrating a network environment in which embodiments of the invention may be implemented. As shown in FIG. 2, a network environment 200 includes a client 203 and a server 201 connected over a network 210. The server 201 makes available a portion of a shared volume 220 to the client 203. As is known in the art, a user of the client 203 may connect to the server 201 over the network 210 and access files on the shared volume 220 if the user has sufficient privileges. When connected, the shared volume 220 appears on the client 203 as a directory structure 240 representing folders and files stored on the shared volume 220. It should be appreciated that FIG. 2 illustrates the entire shared volume 220 as being made available to the client 203. However, it will be appreciated that typically only small portions (e.g., sub-directory trees) of a shared volume are actually made available as a "share," and that one shared volume typically has multiple shares. Different clients and users may have access to different shares on the same shared volume. However, for simplicity of description only, this document will describe the system in the context of a single shared volume 220.

The client 203 and the server 201 may communicate using one of many different communication protocols. One communication protocol that is commonly used for distributed file systems is the Network File System (NFS) protocol. The NFS protocol provides transparent remote access to shared files and directories across networks. The NFS protocol is designed to be portable across different machines, operating systems, network architectures, and transport protocols. More information about the NFS protocol may be found in RFC 3530, which is publicly available.

The server 201 also provides a volume shadow service that enables a user to return to a prior state of the shared volume 220. In other words, the server 201 captures an image or "snapshot" of the shared volume 220 at periodic instances of time. As illustrated in FIG. 2, a first snapshot 221 represents the state of the data on the shared volume 220 at some time prior to the current state of the shared volume 220. Likewise, a second snapshot 222 represents the state of the data on the shared volume 220 at some time prior to when the first snapshot 221 was captured. The server 201 may make available very many snapshots of the shared volume 220 over a significant period of time.

At the client 203, the current directory structure 240 represents the current state of the data stored on the shared volume 220. In addition, a user of the client 203 may potentially access any of the snapshots of the shared volume 220. Each snapshot of the shared volume 220 is exposed to the client 203 by the server 201 as a separate directory structure representing the data corresponding to the snapshot. Thus, the current directory structure 240 is associated with the current shared volume 220, directory structure 241 is associated with the first snapshot 221, directory structure 242 is associated with the second snapshot 222, and directory structure 243 is associated with the Nth snapshot 223.

As previously mentioned, using conventional technologies, each snapshot of the shared volume 220 (e.g. first snapshot 221, second snapshot 222, Nth snapshot 223) is accessed at the client 203 as a separate volume. In other words, to view the first snapshot 221, a user would mount a new volume on the client corresponding to the first snapshot 221. If the user desires to view multiple snapshots, multiple new volumes would need to be mounted on the client 203. As described above, this technique commonly results in namespace pollution, and requires heightened privileges for the user mounting the snapshots.

In contrast, the invention enables each snapshot to be represented at the client 203 as part of the shared volume 220 rather than as a separate volume. As described in greater detail below, the server 201 provides information to the client 203 in connection with the current directory structure 240 that allows direct access to each snapshot of the shared volume 220. In this way, the invention overcomes the existing need for heightened user privileges to mount additional volumes. In addition, the user is not confused by having multiple volumes mounted in the namespace of the client 203 that each represent essentially the state of the same data at different points in time.

Figure 3:
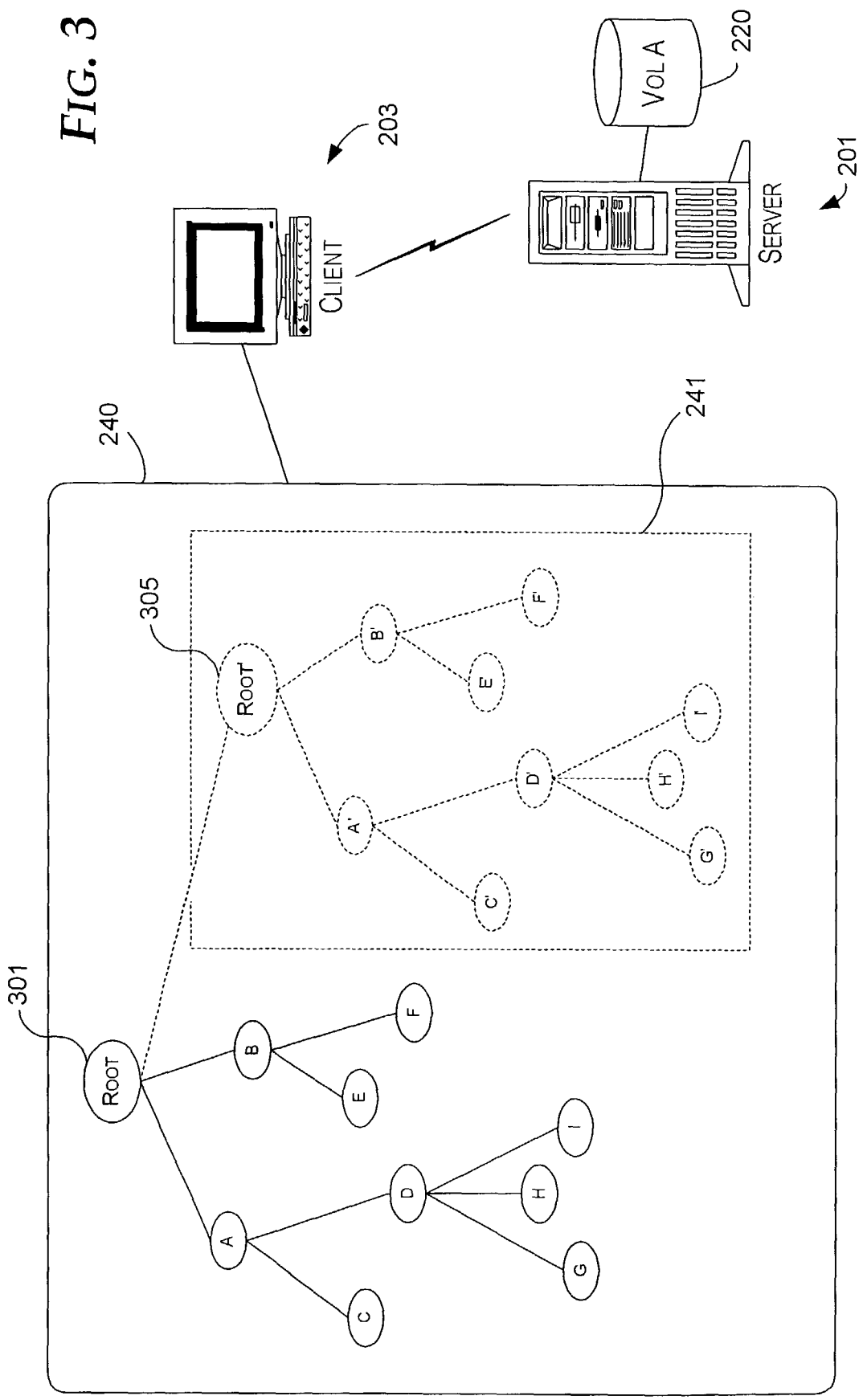
FIG. 3 is a graphical representation of a directory structure corresponding to a shared volume made available to the client by a server that provides direct access to one or more snapshots of the shared volume.

FIG. 3 is a graphical representation of a directory structure 240 corresponding to a shared volume made available to the client 203 by a server that provides direct access to one or more snapshots of the shared volume. The directory structure 240 represents a view of the files and folders resident on the shared volume that are available to the client 203. The directory structure 240 is a tree structure having a root 301 that represents the root of the share. The directory structure 240 is provided to the client 203 when the shared volume 220 is mounted at the client 203 and may be dynamically updated either in response to some event (e.g., the addition of new snapshots or the removal of old snapshots) or based on some periodic interval. Several other resources are included in the directory structure 240 under the root 301, including files (e.g. files C and F) and folders (e.g. folders A and D). It should be noted that as used in this document, no distinction should be drawn between accessing resources, files, and directories. Indeed, it is envisioned that each of these types of accesses are essentially the same for the limited purpose of this discussion.

In accordance with the invention, another directory structure, e.g. directory structure 241, resides as a child of the root 301 of the current directory structure 240. The child directory structure 241 represents a directory structure associated with a snapshot of the shared volume represented by the current directory structure 240. In other words, the current directory structure 240 represents the current state of its corresponding shared volume, and the child directory structure 241 represents a prior state of the corresponding shared volume.

In this particular embodiment, the child directory structure 241 exists in a hidden state under the root 301. In this way, a user viewing the namespace of the client 203 will see elements of the current directory structure 240 but will not see the child directory structure 241 by default. Should the user desire to view a snapshot of the shared volume 220, the user can select an option to view hidden files under the root 301, thereby gaining access to the directory structure 241 of the snapshot.

It should be noted that this procedure does not require heightened privileges, such as privileges associated with mounting a new volume, thus enabling common users (e.g., users without privileges to mount a volume) access to snapshots. In addition, if the user does mount one or more snapshots for a shared volume, the user will not be confused by having multiple versions of essentially the same shared volume resident in the namespace of the client 203. It should be appreciated that while only a single child directory structure 241 is illustrated in FIG. 3, in fact multiple child directory structures may exist in the current directory structure 240, one for each of a plurality of snapshots of the shared volume 220.

Access to the child directory structure 241 uses normal access-control mechanisms based on the permissions stored as part of the file system. In particular, users can only see the existence of snapshots to which they have at least read access. To prevent the client 203 from modifying any of the resources associated with the snapshot, read-only access is enforced by the server, regardless of the user's ownership, access rights, or permissions on the files in question. In other words, if a user is viewing a resource in a snapshot, the user will be able to examine the particular access privileges that were assigned to that resource when the snapshot was captured, but the server will enforce read-only privileges regardless. Other implementations may however allow some additional access to the snapshot. For instance, in other embodiments, a special group of users may be given particular privileges to modify a snapshot while ordinary users have only read-only access.

Figure 4:
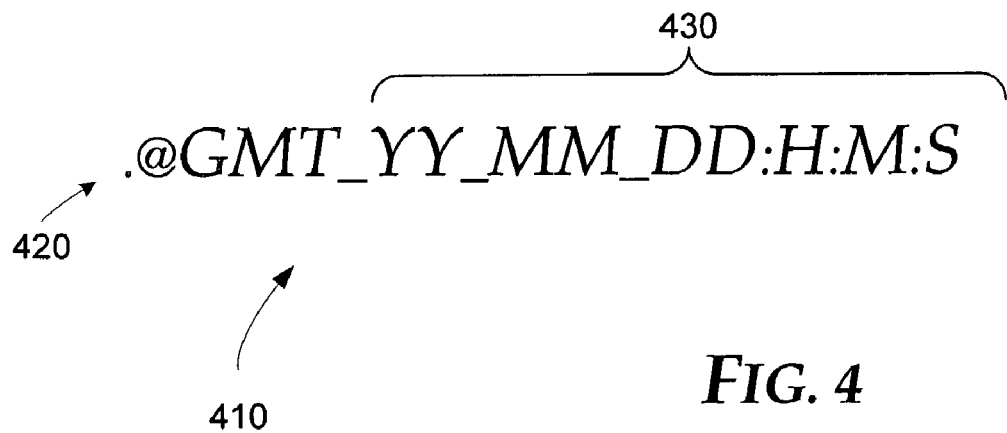
FIG. 4 is a graphical representation of a general naming convention for the name of the root of the child directory structure illustrated in FIG. 3.

In this embodiment, the name of the child directory structure 241 exposed to the client is chosen to prevent common tools from enumerating the snapshot volumes. More particularly, the name of the child directory structure 241 may be based on the creation time of its corresponding snapshot. In one example, a name such as that illustrated in FIG. 4 may be used. Referring briefly to FIG. 4, a general naming convention for the name 410 of the root 305 of the child directory structure 241 is illustrated. As illustrated, a period 420 is used to begin the name to indicate that the entry is to be hidden within the parent directory structure 240. The body 430 of the name 410 may be based on the Greenwich Mean Time (GMT) associated with the creation of the corresponding snapshot. By incorporating the creation time into the naming convention, each snapshot will be uniquely distinguishable. This naming convention is provided as one example of any of multiple different naming conventions that may be used. This example is not limiting, and many alternative naming conventions will become apparent to those skilled in the art without departing from the spirit of the invention.

It should also be noted that the names provided to the client for snapshots are not necessarily persisted on the server and are not used to name actual resources on the shared volume. Rather, the names used of the child directory structures associated with snapshots are associated with virtual directories only, and not actual persisted resources. Accordingly, if the shared volume were examined by some mechanism other than as a share at the client (e.g., through local file system access), the names exported to the clients would not necessarily appear.

Identifying a Child Directory Structure as a Snapshot

Figure 5:
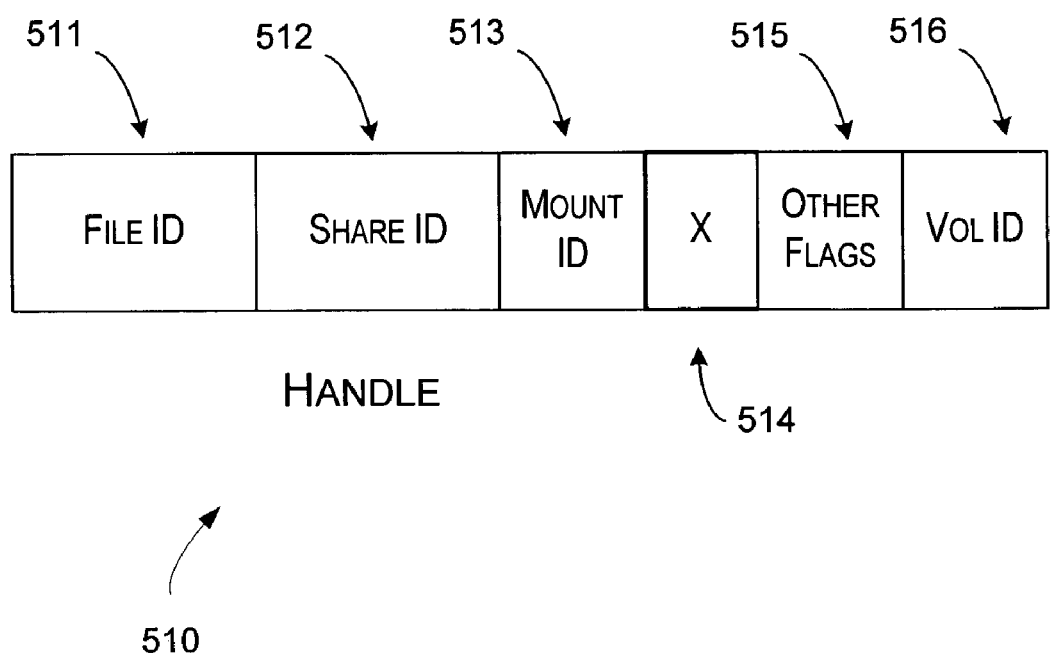
FIG. 5 is a graphical representation of a file handle used to access files over a distributed file system including a snapshot flag field to indicate that a snapshot is being accessed.
Figure 6:
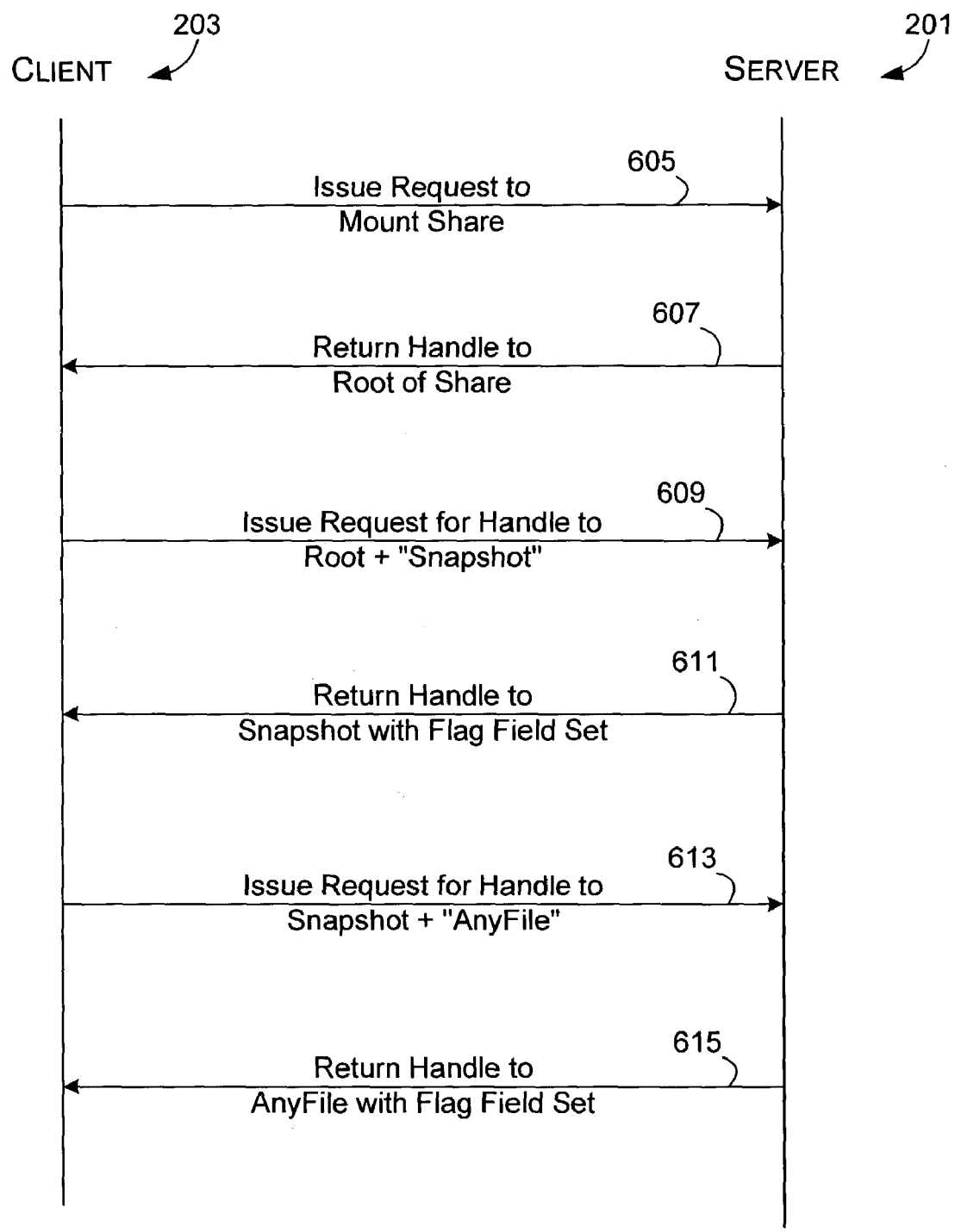
FIG. 6 is a functional flow diagram generally illustrating how resources on a snapshot may be accessed in accordance with the invention.

FIGS. 5 and 6 illustrate how one implementation of the invention uses a flag in a resource handle to identify the resource as a snapshot. As is known in the art, each resource on the shared volume may be identified by the client 203 using a unique file handle. The file handle is a token by which the client 203 refers to files or directories on the server 201. The file handle is created by the server 201 when a pathname-translation request (lookup) is sent from the client 203 to the server 201. The server 201 locates the requested file or directory and ensures that the requesting user has access permission. If permission is granted, the server 201 creates a file handle for the requested file and returns it to the client 203. The file handle identifies the file in future access requests by the client 203. The client 203 maintains a volume handle table to store the file handles for each file being accessed by the client 203.

The structure of file handles used with different network systems may vary. FIG. 5 illustrates an example of one file handle 510 used in one implementation of the invention. The example file handle 510 includes a volume ID and a mount ID, which together identify the particular incarnation of the volume on which the requested file resides. The file handle 510 also includes a share ID that identifies the root resource of the shared volume, and a file ID 511 that identifies which particular file is referenced by the file handle 510.

In addition, the example file handle 510 used in this discussion includes a flag field 514 to indicate that the referenced file resides on a snapshot rather than on the current volume. In other words, because the directory structure associated with the snapshot exists as a resource on the current share, the potential exists for ambiguity when identifying whether the file being referenced is the current file or a version of the file resident on a snapshot. Accordingly, a flag field 514 is included in the file handle 510 to indicate that the requested file resides on a snapshot and that the share ID 512 in the file handle 510 refers to a snapshot share. In addition, the snapshot flag informs the server 201 that the resources referred to by the file handle 510 may not be modified despite whatever modification privileges may be indicated on the file.

FIG. 6 is a functional flow diagram generally illustrating how resources on a snapshot may be accessed in accordance with the invention. The flow diagram illustrates the occurrence of events and the direction of messages traveling between the server 201 and the client 203. The arrows indicate the direction a message travels, i.e. from the client 203 to the server 201 or vice versa.

Initially, at message 605, the client 203 issues a request to the server 201 to mount a particular shared volume. The server 201 responds, at message 607, by returning a file handle to the root of the requested share. At this point, the client 203 may request access to files within the shared volume. If a user desires access to a snapshot of the shared volume, the client 203 issues a request, at message 609, for the file handle to a file stored under the root of the shared volume. To do so, the client 203 passes to the server 201 the root handle plus an identifier for the requested resource (the snapshot in this example). In response, at message 611, the server 201 returns a handle to the snapshot. As discussed above, the handle to the snapshot may include a flag bit that indicates the handle is associated with a snapshot. Finally, the client may access any file on the snapshot by issuing, at message 613, a request for a file handle to that file ("Anyfile").

The server 201 responds, at message 615, by returning a file handle to the requested file with the snapshot flag bit properly set.

In this manner, a client computer with access to a shared volume may directly access any snapshots of that shared volume without a need to mount new volumes on the client computer. This advantage eliminates the prior need for heightened access privileges, which could often times make accessing the snapshot inconvenient. In addition, accessing a snapshot through the mechanism of the invention requires no modifications to existing network file access protocols, greatly simplifying its implementation.

The above specification, examples and data provide a complete description of the concepts and illustrative implementations of the invention. Since many embodiments of the invention can be made without departing from the spirit and scope of the invention, the invention resides in the claims hereinafter appended.

I claim:

1. A computer-readable storage medium having computer-executable instructions, a storage device comprising the computer-readable storage medium, the computer-executable instructions configured for associating a volume shadow copy with a current state of data stored on a shared volume, the instructions comprising:

sending a request from a user with access to a limited portion of a full data volume to a server; wherein the full data volume is associated with a plurality of users, with each user associated with a set of permissions that define the limited portion of the full data volume the user may access; wherein the shared volume comprises the limited portion of the full data volume that is made available to the user as a shared volume in response to access privileges associated with the user and the full data volume;

receiving a first file handle to a root of the shared volume;

obtaining a current directory structure, wherein the current directory structure includes a current state of data stored on the shared volume;

automatically creating a volume shadow copy of the shared volume for later recovery, wherein the volume shadow copy includes a volume shadow copy directory structure; and wherein only the limited portion of the full data volume that is made available to the user as a share is obtained;

associating the volume shadow copy with the current directory structure, wherein the volume shadow copy directory structure is a child of the current directory structure, wherein the volume shadow copy directory structure is accessible from the current directory structure, and wherein the current directory structure and the volume shadow copy directory structure are part of the shared volume; wherein a file within the shared volume is at a higher hierarchical level within the current directory structure than a corresponding file for the file that is within the volume shadow copy;

sending a request to the server for a second file handle to a snapshot file located in the volume shadow copy directory structure that is a child of the current directory structure;

receiving the second file handle from the server, wherein the second file handle includes a flag field that differentiates all files that are stored in both the current directory structure and the volume shadow copy directory structure such that the snapshot file included within the volume shadow copy of the shared volume and a standard file that are both located in the current directory structure are differentiated by an indication that the snapshot file is associated with the volume shadow copy, wherein the second file handle includes a share identifier identifying a root resource of the shared volume, the flag field indicates the share identifier refers to a snapshot share, and the flag field further indicates that the snapshot file referred to by the second file handle cannot be modified despite modification privileges associated with the snapshot file;

hiding the volume shadow copy so that the volume shadow copy is not visible in the current directory structure, wherein the name of the volume shadow copy is configured to prevent enumeration of the volume shadow copy directory structure;

receiving a request to display the volume shadow copy;

displaying the volume shadow copy in response to the request to display the volume shadow copy; and accessing the volume shadow copy for the snapshot file.

2. The computer-readable storage medium of claim 1, wherein the current directory structure includes a directory tree structure.

3. The computer-readable storage medium of claim 1, wherein the shared volume is associated with a network file system protocol.

4. The computer-readable storage medium of claim 1, wherein the volume shadow copy is hidden by default.

5. The computer-readable storage medium of claim 1, wherein the volume shadow copy comprises a name uniquely distinguishing the volume shadow copy from other volume shadow copies of the shared volume.

6. The computer-readable storage medium of claim 5, wherein the name is based on a creation time of the volume shadow copy.

7. The computer-readable storage medium of claim 5, wherein the name is a virtual name.

8. The computer-readable storage medium of claim 1, wherein the current directory structure and the volume shadow copy directory structure include the same access requirements.

9. The computer-readable storage medium of claim 1, wherein access to the volume shadow copy directory structure uses access-control mechanisms based on permissions stored in association with the shared volume.

10. The computer-readable storage medium of claim 1, wherein access to the volume shadow copy is provided on a read-only basis.

11. The computer-readable storage medium of claim 1, wherein access to the volume shadow copy is provided on a read/write basis.

12. A system comprising a computer-readable storage medium encoded with a data structure, a storage device comprising the computer-readable storage medium, the data structure configured to accessing a volume shadow copy for a snapshot file, the system comprising:

sending a request from a user with access to a limited portion of a full data volume to a server; wherein the full data volume is associated with a plurality of users, with each user associated with a set of permissions that define the limited portion of the full data volume the user may access; wherein the shared volume comprises the limited portion of the full data volume that is made available to the user as a shared volume in response to access privileges associated with the user and the full data volume;

receiving a first file handle to a root of the shared volume;

obtaining a current directory structure, wherein the current directory structure includes a current state of data stored on the shared volume;

automatically creating a volume shadow copy of the shared volume for later recovery, wherein the volume shadow copy includes a volume shadow copy directory structure; and wherein only the limited portion of the full data volume that is made available to the user as a share is obtained associating the volume shadow copy with the current directory structure, wherein the volume shadow copy directory structure is a child of the current directory structure, wherein the volume shadow copy directory structure is accessible from the current directory structure, and wherein the current directory structure and the volume shadow copy directory structure are part of the shared volume; wherein a file within the shared volume is at a higher hierarchical level within the current directory structure than a corresponding file for the file that is within the volume shadow copy;

sending a request to the server for a second file handle to the snapshot file located in the volume shadow copy directory structure that is a child of the current directory structure;

receiving the second file handle from the server, wherein the second file handle includes a flag field that differentiates all files that are stored in both the current directory structure and the volume shadow copy directory structure such that the snapshot file included within the volume shadow copy of the shared volume and a standard file that are both located in the current directory structure are differentiated by an indication that the snapshot file is associated with the volume shadow copy, wherein the second file handle includes a share identifier identifying a root resource of the shared volume, the flag field indicates the share identifier refers to a snapshot share, and the flag field further indicates that the snapshot file referred to by the second file handle cannot be modified despite modification privileges associated with the snapshot file;

hiding the volume shadow copy so that the volume shadow copy is not visible in the current directory structure, wherein the name of the volume shadow copy is configured to prevent enumeration of the volume shadow copy directory structure;

receiving a request to display the volume shadow copy;

displaying the volume shadow copy in response to the request to display the volume shadow copy; and accessing the volume shadow copy for the snapshot file.

13. The system of claim 12, wherein the current directory structure and the volume shadow copy directory structure are maintained on the server and provided to a requesting client computer over a network.

14. The system of claim 13, wherein the server and the requesting client computer communicate using a network file system protocol.

15. The system of claim 12, wherein the volume shadow copy comprises a name based on a creation time of the volume shadow copy.

16. The system of claim 15, wherein the name is a hidden entry in the current directory structure by default.

17. A computer-implemented method for accessing a file over a distributed file system, the method comprising:

sending a request from a user with access to a limited portion of a full data volume to a server; wherein the full data volume is associated with a plurality of users, with each user associated with a set of permissions that define the limited portion of the full data volume the user may access; wherein the shared volume comprises the limited portion of the full data volume that is made available to the user as a shared volume in response to access privileges associated with the user and the full data volume;

receiving a first file handle to a root of the shared volume;

obtaining a current directory structure, wherein the current directory structure includes a current state of data stored on the shared volume;

automatically creating a volume shadow copy of the shared volume for later recovery, wherein the volume shadow copy includes a volume shadow copy directory structure; and wherein only the limited portion of the full data volume that is made available to the user as a share is obtained associating the volume shadow copy with the current directory structure, wherein the volume shadow copy directory structure is a child of the current directory structure, wherein the volume shadow copy directory structure is accessible from the current directory structure, and wherein the current directory structure and the volume shadow copy directory structure are part of the shared volume; wherein a file within the shared volume is at a higher hierarchical level within the current directory structure than a corresponding file for the file that is within the volume shadow copy;

sending a request to the server for a second file handle to a snapshot file located in the volume shadow copy directory structure that is a child of the current directory structure;

receiving the second file handle from the server, wherein the second file handle includes a flag field that differentiates all files that are stored in both the current directory structure and the volume shadow copy directory structure such that the snapshot file included within the volume shadow copy of the shared volume and a standard file that are both located in the current directory structure are differentiated by an indication that the snapshot file is associated with the volume shadow copy, wherein the second file handle includes a share identifier identifying a root resource of the shared volume, the flag field indicates the share identifier refers to a snapshot share, and the flag field further indicates that the snapshot file referred to by the second file handle cannot be modified despite modification privileges associated with the snapshot file;

hiding the volume shadow copy so that the volume shadow copy is not visible in the current directory structure, wherein the name of the volume shadow copy is configured to prevent enumeration of the volume shadow copy directory structure;

receiving a request to display the volume shadow copy;

displaying the volume shadow copy in response to the request to display the volume shadow copy; and accessing the volume shadow copy for the snapshot file.

18. The computer-implemented method of claim 17, further comprising evaluating access permissions associated with the requests to determine whether the permit access to the volume shadow copy.

* * * * *

UNITED STATES PATENT AND TRADEMARK OFFICE
CERTIFICATE OF CORRECTION

PATENT NO. : 7,730,033 B2  Page 1 of 1
APPLICATION NO. : 10/461564
DATED : June 1, 2010
INVENTOR(S) : Ahmed Hassan Mohamed It is certified that error appears in the above-identified patent and that said Letters Patent is hereby corrected as shown below:

In column 10, line 62, in Claim 18, delete "the permit" and insert -- to permit --, therefor.

Signed and Sealed this
Twenty-fifth Day of January, 2011

David J. Kappos
*Director of the United States Patent and Trademark Office*